Feb. 6, 1968  F. B. KENDRICK, JR  3,367,410
COOLING SYSTEM
Filed June 29, 1965
2 Sheets-Sheet 1

INVENTOR.
FRANK B. KENDRICK Jr.
BY
Edward W. Nyssaver
his ATTORNEY

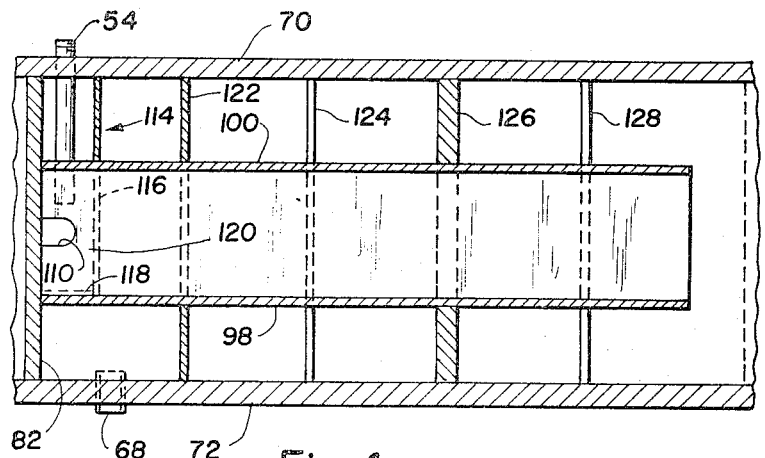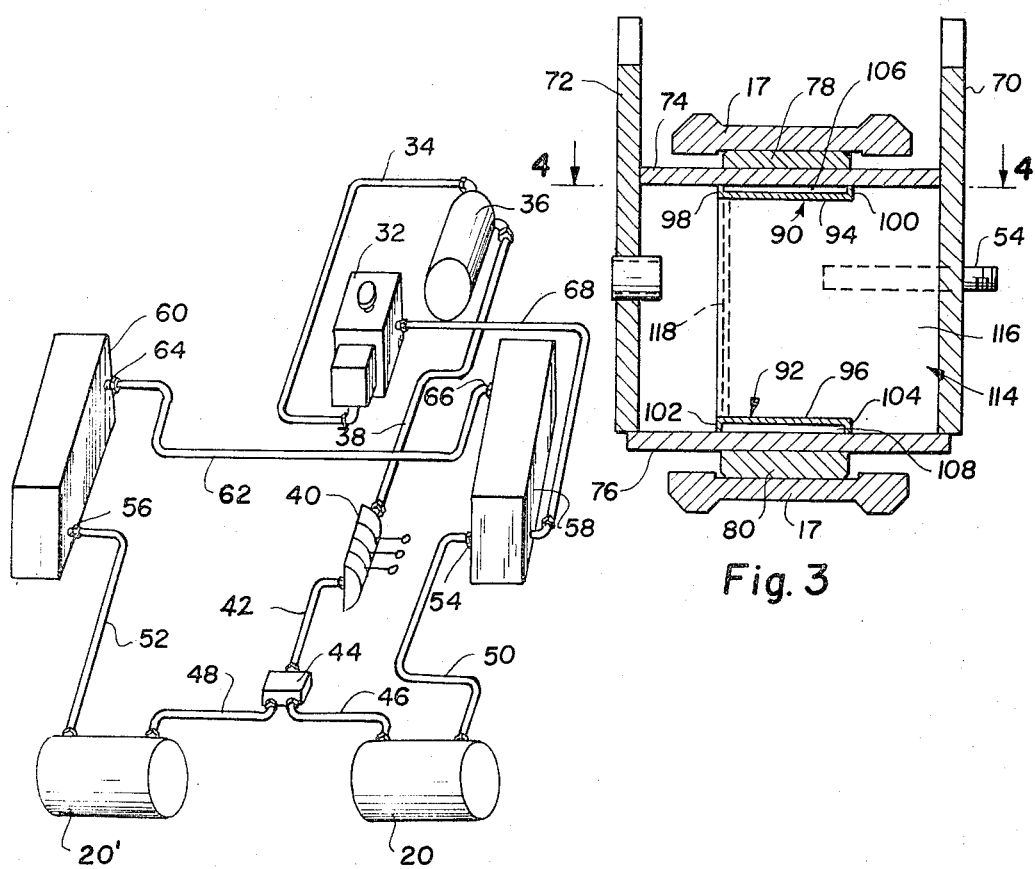

United States Patent Office 3,367,410
Patented Feb. 6, 1968

3,367,410
COOLING SYSTEM
Frank B. Kendrick, Jr., Franklin, Pa., assignor to Joy Manufacturing Company, Pittsburgh, Pa., a corporation of Pennsylvania
Filed June 29, 1965, Ser. No. 467,876
8 Claims. (Cl. 165—41)

ABSTRACT OF THE DISCLOSURE

A crawler mounted mobile vehicle having a heat exchanger mounted in at least one of the crawler frames of the vehicle with a fluid circulating through the heat exchanger and the motor of the vehicle to use the heat sink property of the ground for cooling the motor.

---

Heavy material handling devices of the self-propelled type such as mining machines, cutting machines, material gathering machines, etc. are very often propelled by crawler tread means which are driven by electric motors.

In view of the power requirements and space restrictions, much heat is developed in these motors which must be dissipated. In many applications of these mobile devices, the ambient air is of such a relatively high temperature that it constitutes an impractical coolant for the motors. Accordingly, it has been found desirable to utilize a liquid coolant such as hydraulic fluid by way of example; however, this poses the problem of cooling the liquid coolant since it must be recycled.

The apparatus of the present invention provides a solution to the above problem by providing a tank unit or heat exchanger integral with the crawler tread frame, such heat exchanger being mounted adjacent the crawler tread shoes which in their orbital movement, engage a ground surface having a generally low constant temperature. Thus heat is transferred from the relatively hot oil through the crawler tread frame and the shoes to the relatively cold ground surface.

The following is a detailed description and drawings of a preferred embodiment of the invention, in which:

FIG. 3 is a vertical section taken through the crawler tread frame on the plane of line 3—3 of FIG. 2;

FIG. 4 is a horizontal section taken through the crawler tread frame on the plane of line 4—4 of FIG. 3; and FIG. 5 is a diagrammatic view illustrating the liquid coolant circuit for the traction motors.

Figure 1:
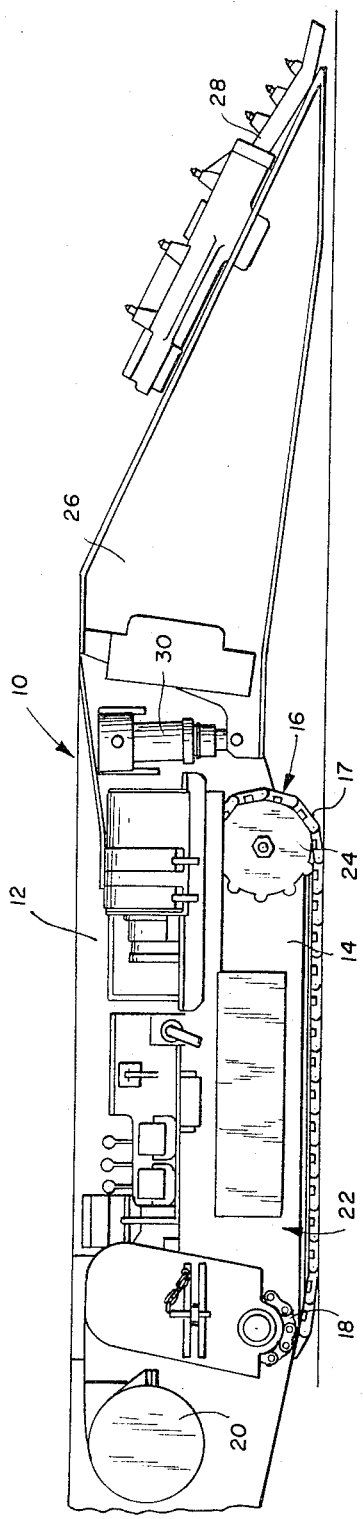
FIG. 1 is a side elevation view of the forward portion of a mobile loading machine in which a preferred illustrative embodiment of the invention is incorporated.

Referring now to these drawings, it may be noted that the invention is, by way of illustration, incorporated in a loading machine, generally designated 10, having main frame 12 mounted on a mobile base 14 having a pair of laterally spaced tractor or crawler treads 16 (only one of which is shown in FIG. 1), which may be independently operated in a conventional manner through chain and sprocket connections 18 from traction motors 20. The crawler treads 16 comprise a plurality of shoes 17 (see FIG. 3) which are mounted on support or crawler frames, generally designated 22, for movement relative thereto in an orbital path about a pair of longitudinally spaced sprockets 24 (only one of which is shown in FIG. 1).

Mounted on main frame 12 at the forward end thereof is a suitable tiltable loading head 26 having conventional, oscillatory, gathering, foldable arms 28 for gathering loose material from the ground surface and for moving the material so gathered onto the forward receiving portion of an endless flight conveyor (not shown) which is located centrally of the apparatus and extends substantially along the length thereof and terminates at a discharge section which is swingable about a vertical axis and tiltable about a horizontal axis, respectively as is well known in the art. The gathering head is tiltable about a horizontal axis by means of a pair of fluid jacks 30 (only one of which is shown in FIGURE 1). Since the structure of the gathering mechanism and the conveyor mechanism is conventional and has been widely used in well known commercial structures by applicant's assignee, it is believed that no further illustration or explanation is required. For a more detailed description of the gathering mechanism and conveyor mechanism, reference may be had to applicant's United States Patent No. 2,793,732,.

Traction motors 20 tend to become very hot in operation, but are effectively cooled according to the present invention by a suitable liquid coolant, such as hydraulic oil by way of example, supplied from a suitable tank or reservoir 32 carried by the machine.

Referring to the diagrammatic showing of the hydraulic circuit in FIGURE 5, it will be observed that a source of hydraulic fluid is shown at 32 and is connected by a suitable suction line 34 with a suitable hydraulic pump 36 which is driven from any suitable source of power, not shown. Pump 36 delivers fluid under pressure to conduit 38 which is connected with the main hydraulic control valve 40. Leading from the control valve 40 is a conduit 42 connected to a conventional flow divider 44 which is connected by means of conduits 46 and 48 to suitable traction motors 20 and 20', respectively. Conduits 50 and 52 connect the traction motors 20 and 20', respectively, to hot-fluid inlet ports 54 and 56 of heat exchangers 58 and 60, respectively. Conduit 62 connects outlet port 64 of heat exchanger 60 to a port 66 of heat exchanger 58 which in turn is connected to the reservoir 32 by way of cool-fluid outlet conduit 68.

Figure 2:
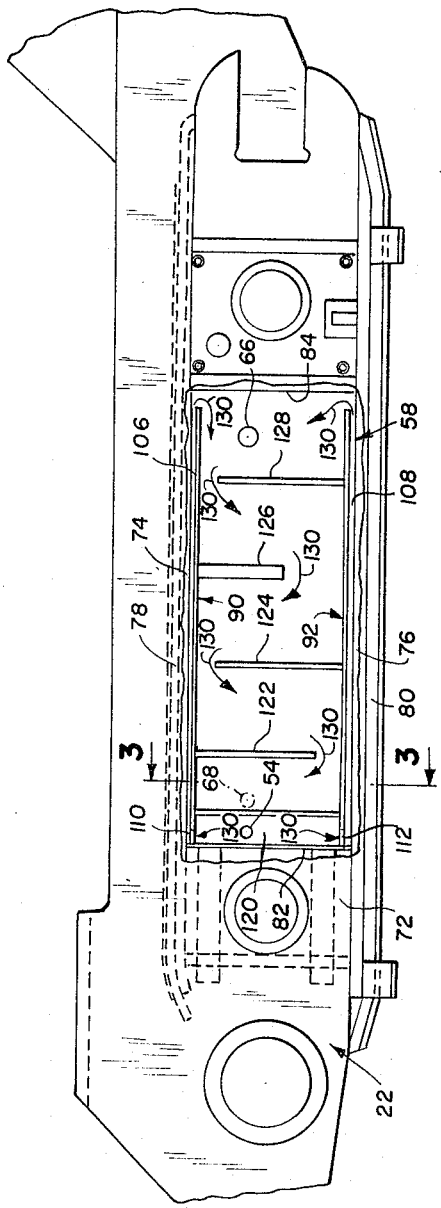
FIG. 2 is an enlarged fragmentary side elevation view of the crawler tread frame with parts removed to show details of the heat exchanger.

Since the structure of the heat exchangers is substantially similar except for conduit 62 communicating with unit 58, the description will be confined to heat exchanger 58 only, as shown in FIGURES 2, 3, and 4. It will be observed that the right hand crawler tread frame 22 is formed from a pair of laterally spaced, elongated, vertical, metallic side plates 70 and 72 extending substantially from the forward sprocket 24 to the rearward sprocket and rigidly connected by a pair of vertically spaced, horizontal, metallic bracing plates 74 and 76 that are substantially as long as the side plates. Rigidly secured to the top of plate 74 and the bottom of plate 76 are a pair of elongated, metallic guide plates 78 and 80, respectively, for supporting and guiding the crawler treads during their movement in an orbital path. End walls 82 and 84 (see FIG. 2) are rigidly secured, as by means of welding for example, to plates 70, 72, 74 and 76 to form a fluid tight heat exchanger unit 58 integral with the crawler frame for containing and cooling a relatively hot liquid.

A pair of shallow U-shaped members 90 and 92 having bight portions 94 and 96 and leg portions 98, 100 and 102, 104, respectively are rigidly secured along the edge of their leg portions to the bottom of plate 74 and the top of plate 76, respectively, to form an upper passageway 106 and a lower passageway 108, respectively, for the circulating fluid. Members 90 and 92 are located centrally of plates 74 and 76, respectively, and extend from end wall 82 to closely adjacent wall 84 and are provided with slots 110 and 112, respectively, for permitting fluid to pass therethrough.

In order to separate inlet port 54 from outlet port 68, a vertical partition generally indicated at 114 is provided adjacent the left end wall 82 having a first portion 116 rigidly secured to side plate 70 and extending from said side plate to the leg portions 98, 102 and a second portion 118 normal to said first portion and rigidly secured to end-wall 82. It should be appreciated that the upper and lower edges of partition 116 are rigidly secured as by means of welding to the upper and lower surfaces of heat exchanger 58 to provide a fluid tight enclosure 120 within the heat exchanger.

A series of vertical baffle plates 122, 124, 126 and 128 are provided in heat exchanger 58 and are rigidly secured to side plates 70 and 72 with plates 122 and 126 extending from member 74 downwardly toward plate 76 and baffle plates 124 and 128 extending from plate member 76 upwardly toward plate 74.

The general mode of operation of the improved cooling apparatus above described is as follows: oil is circulated by the pump 36 through a circuit comprising a pressure conduit 38, a hydraulic control valve 40, through conduit 42 and through a conventional flow divider 44 which divides the flow of fluid through conduits 46 and 48, respectively, to the traction motors 20, 20' wherein the liquid serves to cool the high temperature motors. Relatively hot oil then passes through conduits 50 and 52 into the respective heat exchangers 58 and 60. With reference to FIGURE 2, it will be noted that the hot liquid is directed through slots 110 and 112, respectively, into the passageways 106 and 108, whereby such liquid is cooled by the direct transfer of heat through the plates 74, 78 and 76, 80 to shoes 17 of the crawler tread means 16, which in turn are engageable with the surface of the ground. Quite often the ground surface is covered with pools or puddles of water which further enhances cooling. Most of the heat is dissipated by conduction in the manner above described; however, some heat is also transferred through the crawler tread frame by radiation and convection, depending upon the ambient conditions.

The liquid coolant flows out of passageways 106, 108, and along with the liquid received from exchanger 60 through port 66, flows over plate 128, under plate 126, over plate 124 and under plate 122 in the direction shown by arrow 130 and is discharged through port 68 and returned to reservoir 32 at a substantially lower temperature.

Although passageways 106 and 108 are preferably rectangular in cross section, it should be appreciated that other cross section configurations are contemplated within the purview of this invention. Also, a plurality of either V-shaped, circular, or elliptical pipes disposed in a parallel relationship may be employed, if desired, to provide thermal contact between the flowing liquid and the plate members. Furthermore, the novel cooling system of the present invention is not restricted to material gathering machines, but can be applied to any mobile machine having crawler tread means. Moreover, this system is not limited to cooling traction motors, but may be used for cooling all the electric motors and/or any other component on the apparatus.

What is claimed is:

1. A mobile apparatus comprising: a main frame; at least one support frame mounted on said main frame; ground engaging means mounted on said support frame and guided thereby for orbital movement thereabout; a tank carried by one of said frames, said tank and said support frame having portions in engagement with each other, said tank having means to permit circulation of a fluid therethrough, and said ground engaging means and said portions being of a metallic material to establish thermal conductivity therebetween.

2. A mobile apparatus comprising: a main frame; at least one support frame mounted on said main frame; said support frame having a metallic member with guide surfaces thereon; metallic ground engaging and propelling means mounted on said support frame with portion thereof movably engaging said guide surfaces; a metallic tank carried by one of said frames and having portions thereof engaging said metallic member; and means for circulating a fluid through said tank in contact with said portions thereof so that heat is transferable by conduction through said portions of said tank, said guide surfaces, and said ground engaging means.

3. A mobile apparatus comprising: a main frame; a pair of support frames mounted on said main frame; each of said support frames having a metallic member with guide surfaces thereon; metallic ground engaging means mounted on each of said support frames with portions thereof movably engaging said guide surfaces, respectively, a metallic tank carried by each of said support frames and having portions engaging said metallic member, and means for circulating a fluid through said tanks in contact with said portions thereof, respectively, so that heat is transferable by conduction through said portions of said tanks, said member and said ground engaging means, respectively.

4. A mobile apparatus comprising: a main frame; at least one support frame mounted on said main frame; said support frame having a metallic member with elongated laterally spaced guide surfaces thereon; propelling means mounted on said support frame with metallic ground engaging means orbitable about said member and movably engaging said surfaces; at least one motor carried by one of said frames for moving said means; a tank carried by said support frame and having metallic portions in contact with said metallic member; means for circulating a fluid through said motor whereby heat is transferred from the motor to said fluid; said circulating means further directing the relatively hot fluid through said tank in contact with said portions thereof to cool said relatively hot fluid by conduction through said portions of said tank, said member, and said ground engaging means.

5. A mobile apparatus comprising: a main frame, at least one support frame mounted on said main frame, said support frame having at least one metallic member, means mounted on said support frame for propelling said main frame and having metallic ground engaging means movably engaging said metallic member, at least one motor carried by one of said frames, a tank carried by one of said frames and having a metallic wall portion engaging said metallic member of said support frame, and fluid conducting means having a portion in heat exchange relationship with said motor communicating with said tank to permit circulation of a fluid therethrough.

6. A mobile apparatus as specified in claim 5 wherein: said motor has at least one passageway therein communicating with said fluid conducting means to permit flow of liquid therethrough.

7. A mobile apparatus comprising: a main frame having two support portions, said support portions having at least one metallic member, respectively, means mounted on said support portions for propelling said main frame and having metallic ground engaging means movably engaging said metallic members, respectively, at least one motor carried by said frame, said motor having at least one passageway therein to permit flow of a fluid therethrough, a tank carried by said frame and having a metallic wall portion engaging said metallic member of said support portion, and conduit means communicating between said passageway and said tank to permit circulation of a fluid through said motor and said tank.

8. A mobile apparatus as specified in claim 7 wherein said support portions are crawler support frames, said ground engaging means are endless crawler chains orbitable about said crawler frames in elongated orbits, and said metallic members are pairs of elongated laterally spaced apart guide members.

References Cited

UNITED STATES PATENTS

| | | | |
|---|---|---|---|
| 2,341,000 | 2/1944 | Tucker et al. | 305—11 |
| 2,812,169 | 11/1957 | Filbeck et al. | 165—120 |
| 3,199,582 | 8/1965 | Vogt et al. | 165—151 |

ROBERT A. O'LEARY, *Primary Examiner.*

CHARLES SUKALO, *Examiner.*